(12) United States Patent
Depondt

(10) Patent No.: US 8,782,847 B2
(45) Date of Patent: Jul. 22, 2014

(54) ADAPTER FOR THE ARTICULATED CONNECTION OF A CONNECTING ELEMENT AT THE END OF A WIPER ARM TO A CONNECTOR ELEMENT OF A WIPER BLADE

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/637,081

(22) PCT Filed: Jan. 25, 2011

(86) PCT No.: PCT/EP2011/050929
§ 371 (c)(1),
(2), (4) Date: Sep. 25, 2012

(87) PCT Pub. No.: WO2011/116995
PCT Pub. Date: Sep. 29, 2011

(65) Prior Publication Data
US 2013/0007977 A1 Jan. 10, 2013

(30) Foreign Application Priority Data
Mar. 25, 2010 (DE) .......................... 10 2010 003 269

(51) Int. Cl.
*B60S 1/40* (2006.01)
(52) U.S. Cl.
USPC ................. 15/250.32; 15/250.43; 15/250.201
(58) Field of Classification Search
USPC ........................ 15/250.201, 250.32, 250.43
See application file for complete search history.

(56) References Cited

U.S. PATENT DOCUMENTS

| 8,286,298 B2 * | 10/2012 | Kim ........................... 15/250.32 |
| 8,413,291 B2 * | 4/2013 | Wu ........................... 15/250.201 |
| 2007/0214593 A1 * | 9/2007 | Boland ...................... 15/250.23 |
| 2011/0056041 A1 * | 3/2011 | Wu ............................. 15/250.32 |

FOREIGN PATENT DOCUMENTS

| DE | 10347637 | 5/2005 |
| DE | 202005021307 | 10/2007 |
| EP | 1795406 | 6/2007 |
| WO | 2010028866 | 3/2010 |

OTHER PUBLICATIONS

PCT/EP2011/050929 International Search Report dated Mar. 29, 2011 (Translation and Original, 4 pages).

* cited by examiner

*Primary Examiner* — Monica Carter
*Assistant Examiner* — Michael Jennings
(74) *Attorney, Agent, or Firm* — Michael Best & Friedrich LLP

(57) ABSTRACT

The invention relates to an adapter (22) for the articulated connection of a connecting element (86, 102, 120) at the end of a wiper arm to a connector element (18) of a wiper blade (10), in particular in the flat bar method of construction, wherein the adapter (22) has a base element (24). According to the invention, the base element (24) has two lateral walls (30) which, at the end faces thereof facing away from the wiper arm, are connected by an end cap (26), and in the region of the upper edges (64) thereof are connected to each other by a crosspiece (32) and also by a hub (34). A resilient tongue (38) extends from the crosspiece (32) to the end face on the wiper arm side, and has at the free end thereof an outwardly protruding button (40). Furthermore, guide profiles (50) are provided on the longitudinal edges of the lateral walls (30) facing towards the wiper strip (16).

12 Claims, 4 Drawing Sheets

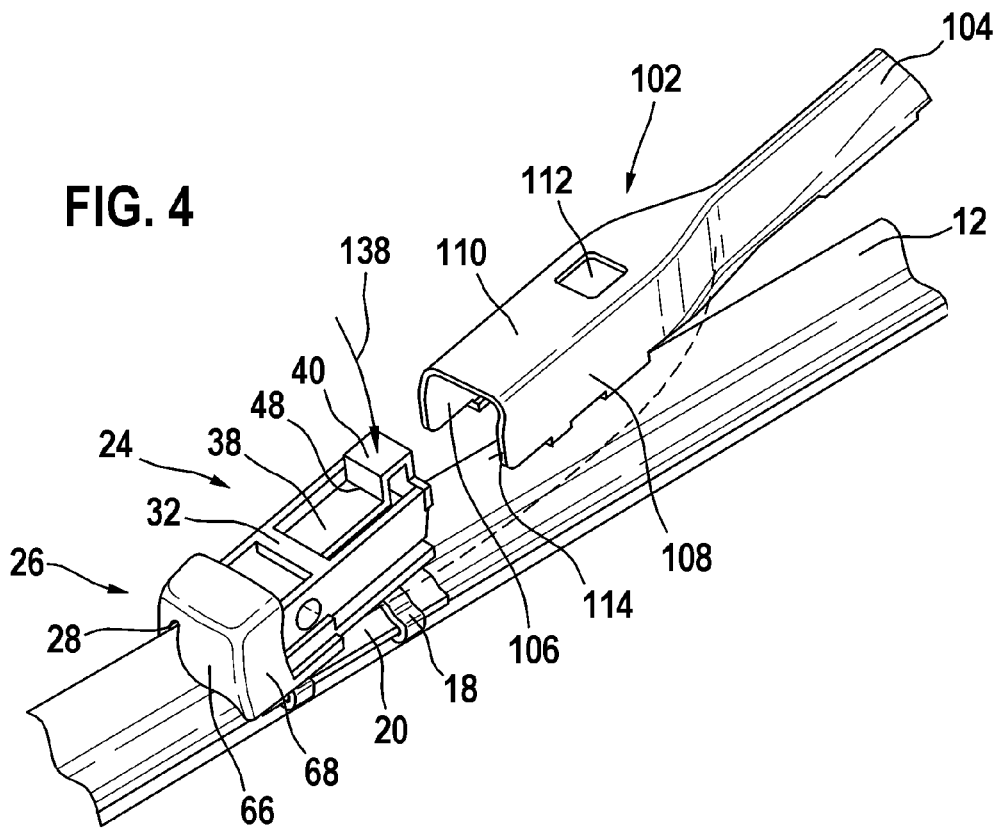

ADAPTER FOR THE ARTICULATED CONNECTION OF A CONNECTING ELEMENT AT THE END OF A WIPER ARM TO A CONNECTOR ELEMENT OF A WIPER BLADE

BACKGROUND OF THE INVENTION

The invention relates to an adapter for the connection of a connecting element at the end of a wiper arm to a connector element of a wiper blade.

The German patent publication DE 20 2005 021 307 U1 discloses a connecting device for the articulated connection of a wiper blade of flat bar construction, which connecting device is suitable for different wiper arms. The connecting device comprises at least one single-part or multi-part connector element which is fastened fixedly, but releasably, to a supporting element in the form of spring rails. An adapter is provided between each wiper arm and the wiper blade, said adapter having on the one hand connecting options for the connector element and on the other hand connecting options for one of the wiper arms or for connecting elements, which are fixedly connected to the respective wiper arm or are integrally formed with the same. A joint, the joint axis of which extends transversely to the longitudinal direction of the wiper blade, is disposed between one of the connecting elements and an adapter, which is connected in a rotationally fixed manner to the connector element or is connected between a part of the adapter connected in a rotationally fixed manner to the connector element and a part of the adapter connected in a rotationally fixed manner to the connecting element. As a result, there are three different adapters for three different connecting elements of the wiper arms.

The connecting device is suitable for a wiper arm with a hook-shaped end or connecting element or an end or connecting element having a lateral bearing pin and a bridge corresponding to a known sidelock principle, or a wiper arm with an end or connecting element, in which the wiper arm runs substantially rectilinearly above the wiper blade and is connected to the connector element according to the toplock principle.

Another connecting device for the articulated connection of a wiper blade to a wiper arm is known from the German patent publication DE 103 47 637 A1. In this case, a connector element in the form of a sheet-metal claw has a central longitudinal web which faces away from the supporting element of the wiper blade and into which a transversely running pivot spindle is inserted in a rotationally fixed manner. An adapter with bearing openings which are arranged in lateral spring tongues is mounted pivotably on the pivot spindle, which projects in a floating manner on both sides of the longitudinal web. The adapter, which is manufactured from plastic, surrounds the sheet-metal claw from the outside and is clipped by means of latching elements and retaining elements into a connecting element which is open toward the wiper blade and is fixedly connected to the wiper arm. The adapter is on the one hand guided laterally on the sheet-metal claw by means of inner guide webs and on the other hand is inserted at the side walls thereof in a play-free manner in the connecting element. For this purpose, use is made of a button which is provided at the end of a spring tongue in a cover wall of the adapter and, in the fitted state, latches into a matching latching hole in a cover wall of the connecting element.

SUMMARY OF THE INVENTION

According to the invention, the base element of the adapter has two lateral walls which, at the end faces thereof facing away from the wiper arm, are connected by an end cap, and in the regions of the upper edges thereof are connected to each other by a crosspiece. In addition, a hub is disposed between the lateral walls, said hub likewise connecting the lateral walls to each other. A resilient tongue extends from the crosspiece to the end face of the base element on the wiper arm side, and has at the free end thereof an outwardly protruding button. Furthermore, guide profiles are provided on the longitudinal edges of the lateral walls facing towards the wiper strip.

A cover cap or two different connecting elements can be fixedly but releasably connected to the base element which is pivotably connected to a connector element of the wiper blade. For this purpose, the guide profiles have advantageously in each case guide grooves which run in the longitudinal direction and are open to the end face on the wiper arm side, as well as guide ribs which run below the guide grooves likewise in the longitudinal direction and protrude toward the wiper strip. Guide surfaces, which run parallel to the upper edges of the lateral walls, adjoin the guide ribs towards the outer sides thereof.

With the cover cap, a first connecting element can be mounted according to the sidelock principle. The lateral walls of the cover cap, which are connected to each other on the side facing away from the wiper strip by means of a cover wall, encompass the lateral walls of the base element. Bearing opening are provided in the lateral walls of the cover cap, which align in the assembled state with the hub of the base element. A beading for a bridge of the first connecting element, which beading runs transversely to the longitudinal direction, is provided offset to the end face of the cover cap on the wiper arm side. The cover cap is fixed to the base element in the longitudinal direction by the button in the end position thereof being latched in a recess in the cover wall. The cover cap is held in the direction of a vertical axis by guide ribs, which protrude inwards at the edges of the lateral walls oriented toward the wiper strip and engage in the guide grooves. When fitting the first connecting element, the base element with the cover cap is rotated about an angle of 90 degrees relative to the first connecting element and a bearing pin is pushed through a bearing opening of the cover cap into the hub of the base element. When turning back to the initial position, a bridge of the first connecting element overlaps the cover cap and secures the position of the adapter with an angled end of the bridge and thereby the position of the wiper blade in the direction of the bearing pin.

Similar to the cover cap, the second and third connecting element are directly connected to the base element of the adapter. They are likewise secured by the button of the base element, which in the end position latches into latching holes in the cover walls of the connecting elements thereof. The second connecting element can differ in the width and/or the height thereof from the third connecting element depending on whether it is guided by guide ribs in the guide grooves or on the upper edges of the side walls and guide surfaces beneath the guide grooves. In the case of different widths, the wider connecting element is guided on the flanks of the guide grooves which protrude over the side walls of the base element.

According to a further embodiment of the invention, the button actuates a blocking element during assembly such that an improper assembly of the connecting elements or the cover cap is prevented. The blocking element is advantageously designed as a slider, which is disposed on the end face of the button on the wiper arm side, protrudes laterally over said button (40) and is guided along the front edges (44) of the lateral walls (30) in an elastically pliable manner.

BRIEF DESCRIPTION OF THE DRAWINGS

Further advantages ensue from the following description of the drawings. In the drawings, exemplary embodiments of the invention are depicted. The drawings, the description and the claims contain numerous features in combination. The specialist in the field will also advantageously examine the features individually and put them together to form further useful combinations.

FIG. 4 shows a perspective partial view of a wiper blade comprising a base element of the adapter during the assembly of a second connecting element, FIG. 5 shows a perspective partial longitudinal cross section through the second connecting element together with the base element of the adapter.

DETAILED DESCRIPTION

Figure 1:
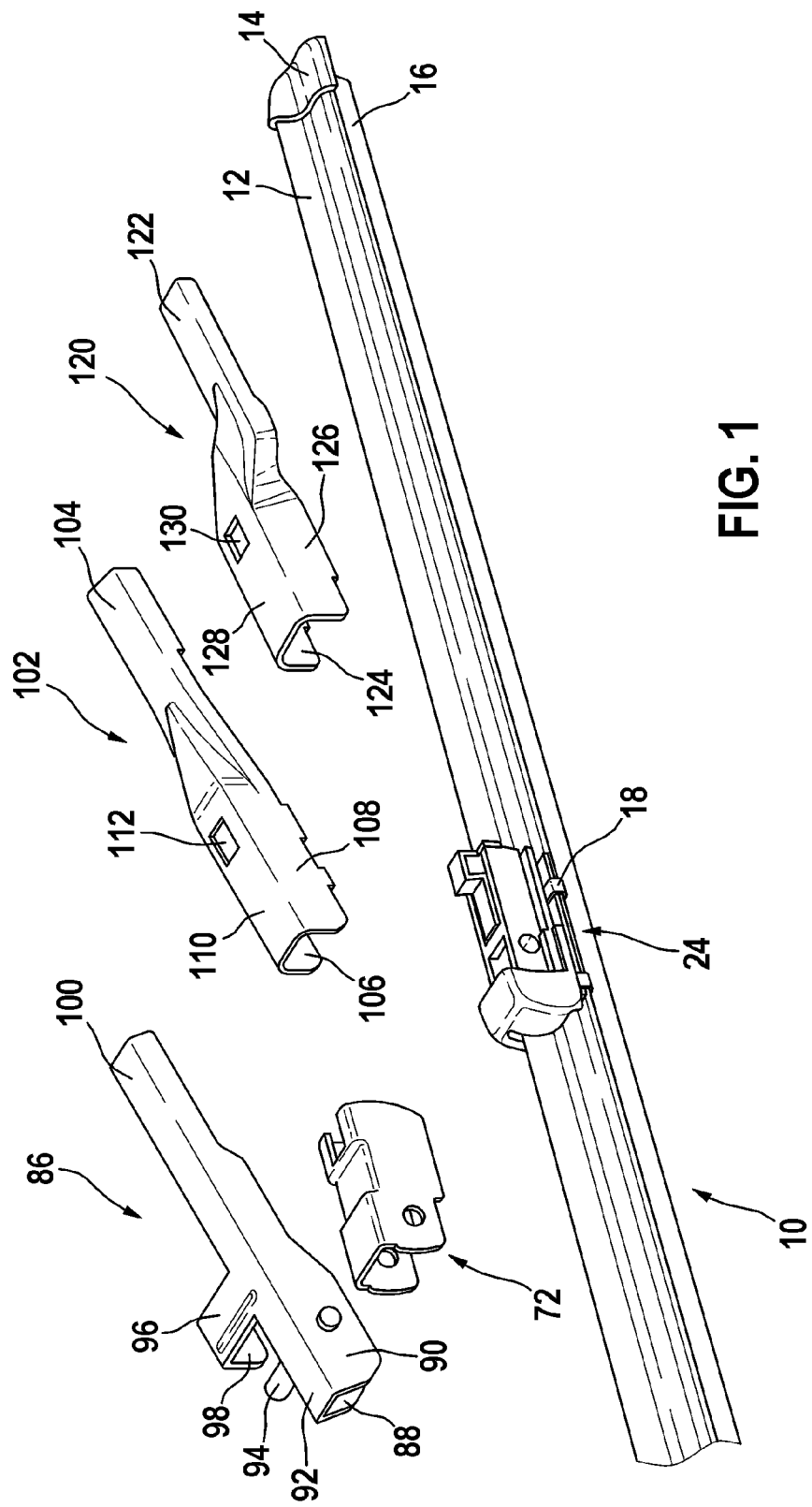
FIG. 1 shows a perspective partial view of three connecting elements in an arrangement and a wiper blade comprising an adapter according to the invention.

A wiper blade 10 has a wiper strip 16, which is held by a supporting element in the form of spring rails. A connector element 18 in the form of a sheet-metal claw is fastened to the supporting element 20 in the central region of the wiper blade 10 (FIG. 4). Spoilers 12 are clipped onto the supporting element 20 in the longitudinal direction 36 on both sides of the connector element 18, or said spoilers are pushed onto said supporting element 20 in the longitudinal direction. Said spoilers 12 are closed on the free ends thereof by end caps 14.

An adapter 22 is pivotably connected to a connector element 18 about an axis running transversely to the longitudinal direction. The adapter 22 has a base element 24, the lateral walls 30 of which are connected to each other by an end cap 26, a crosspiece 32 and a hub 34. The end cap 26 faces the outer end of the wiper blade 10 and has a connector profile 28 for the spoiler 12. The hub 34 is provided offset in the longitudinal direction 36 with respect to the inner end of the wiper blade 10, whereas the crosspiece 32 connects the lateral walls 30 to each other in the central region of the upper edges 64. A resilient tongue 38 runs between the lateral walls in the longitudinal direction 36 from the crosspiece 32 to the inner end of the wiper blade 10, said resilient tongue having an outwardly protruding button 40 on the free end thereof. A fillet 48 is provided on the transition between the button 40 and the spring tongue 38. A slider 42, which laterally protrudes and is guided on front edges 44 of the lateral walls 30, is integrally formed on the opposite side of the button 40 as a blocking element. In the initial position of the button 40, the lower edge of the slider 42 rests against latching steps 46 of the front edges 44 so that the button 40 can only be moved out of the initial position thereof with an increased amount of force.

A guide profile 50 is provided in each case on the lateral walls 30 on the side facing the wiper strip 16. Said guide profile comprises a guide groove 52 which runs in the longitudinal direction 36 and is open toward the outer longitudinal side as well as to the slider 42, whereas a stop 58 is provided on the other end which protrudes laterally over the lateral wall 30. The lower flank 140 of the guide groove 52 protrudes in the same proportion with respect to the upper flank and the lateral wall 30, and therefore the outside of the lower flank 140 forms a level plane with the outer side of the stop 58.

A guide rib 56 runs below the guide groove 52 in the longitudinal direction 36. Said guide rib delimits a guide surface 54 towards the inside, which extends from the outside edge of the lower flank 140 of the guide groove 52 up to the guide rib 56. A further stop 60, which delimits the guide surface 54 in the longitudinal direction 36, is situated in the region of the stop 58 of the guide groove 52. The stop 60 protrudes with respect to the outside edge of the lower flank 140 in the same proportion as the stop 58 with respect to the lateral wall 30 so that two lateral steps result, which adjoin an end face 66 of the lateral walls 68 of the end cap 26. An intermediate space 62 for a longitudinal crosspiece (not depicted) of the connector element 18 is situated between the guide grooves 52.

The cover cap 72 has a substantially U-shaped cross-sectional profile, which is open towards the wiper strip 16 and comprises two lateral walls 74, which are connected to each other by a cover wall 76. A transversely running beading 78 is provided in the cover wall 76. Said beading is offset in the longitudinal direction 36 relative to the bearing opening 80 in the lateral walls 74 towards the inner end of the wiper blade 10. The bearing openings align with the hub 34 of the base element 24 when the cover cap 72 is assembled on the base element 24. In the assembled position, the button 40 latches into a recess 82 of the cover wall 76 of the cover cap 72 so that the button 40 rests with the fillet 48 thereof against an opposing stop edge 84 of the recess 82.

Figure 2:
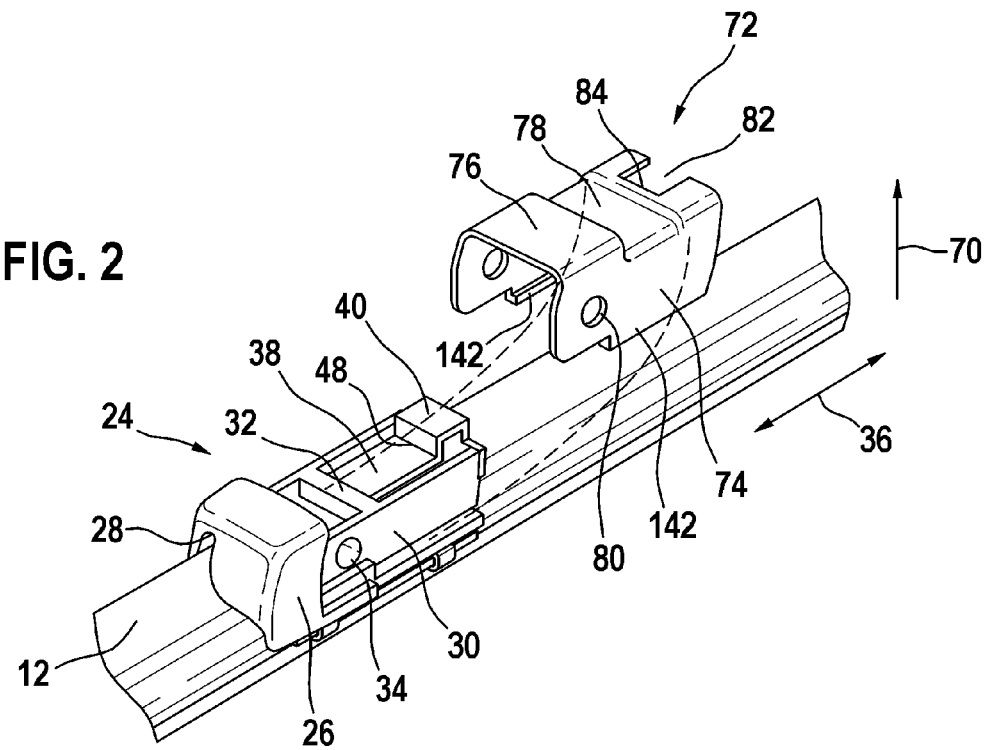
FIG. 2 shows a perspective partial view of a wiper blade comprising the adapter during the assembly of a cover cap.

The side walls of the cover cap 72 comprise inwardly protruding guide ribs 142 on the lower edges thereof, said guide ribs being pushed during assembly along the dashed lines in FIG. 2 into the guide grooves 52. On the side facing the end cap 26, recesses are situated in the region of the guide ribs 142; and therefore the end faces of the guide ribs 142 abut on stops 58 in the assembled state, whereas the lateral walls 74 overlap the steps adjoining the stops 58 and are flush with the outer contour of said steps. During assembly, the button 40 is pushed back from the cover wall 76 until it latches into the recess 82 in said cover wall 76. The cover cap 72 is therefore held in the guide grooves 52 by the guide ribs 142 in the direction of a vertical axis 70 and is secured in the longitudinal direction between the stops 58 and the button 40.

Figure 3:
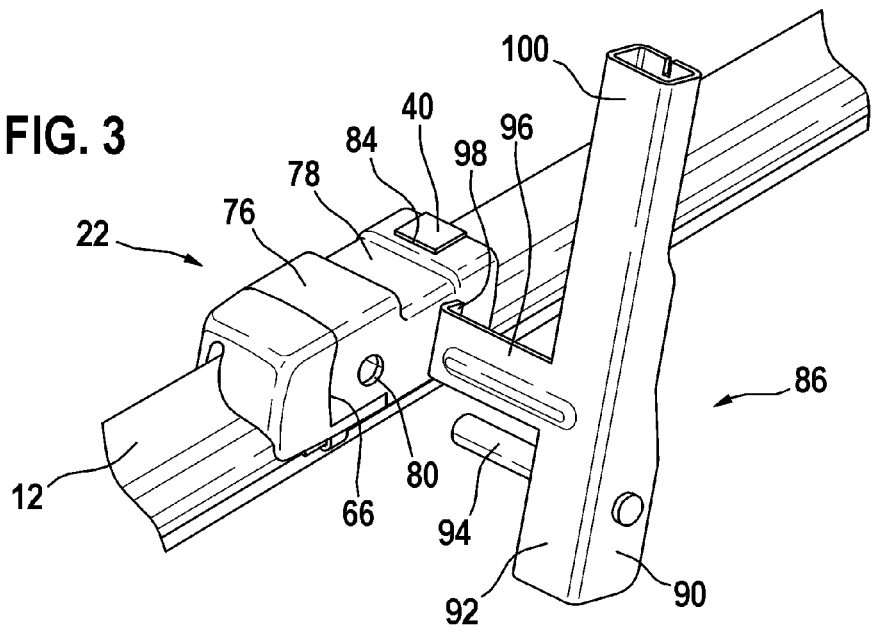
FIG. 3 shows a perspective partial view of a wiper blade comprising the adapter during the assembly of a first connecting element.
Figure 6:
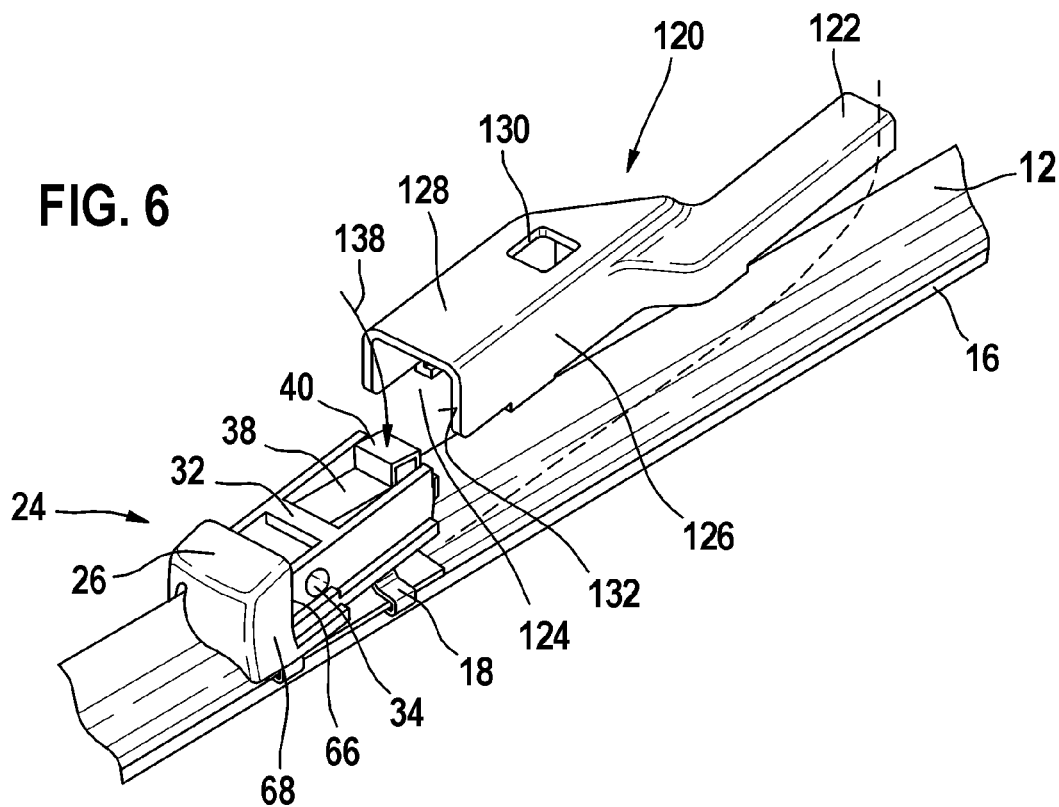
FIG. 6 shows a perspective partial view of a wiper blade comprising the base element of the adapter during the assembly of a third connecting element and FIG. 7 shows a perspective partial longitudinal cross section through the third connecting element together with the base element of the adapter.
Figure 7:
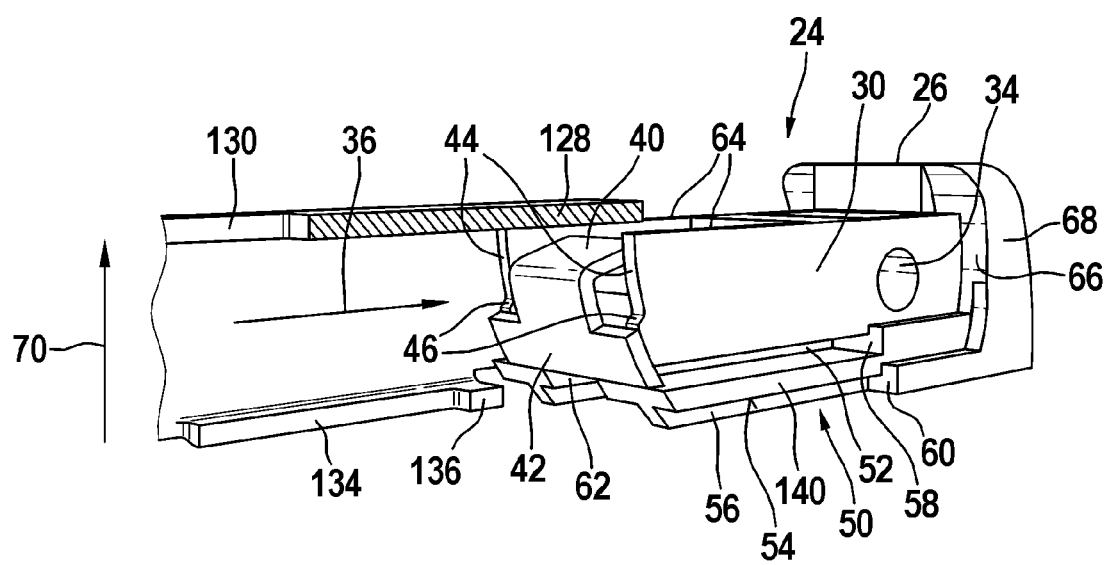

The adapter 22 comprising the base element 24 and the cover cap 72 serves to connect a first connecting element 86 of a wiper arm to the wiper blade 10 according to the sidelock principle (FIG. 3). The first connecting element 86 is fastened with the end 100 on the wiper arm side to the wiper arm, which is not depicted in any detail, e.g. by means of crimping or by said connecting element being integrally formed with the wiper arm. On the opposite end, the first connecting element 86 has a substantially U-shaped cross-sectional profile 88 which is open towards the wiper strip 16 and is formed by two lateral walls 90 and a cover wall 92. A bearing pin 94 running transversely to the longitudinal direction 36 is riveted to the lateral walls 90 in the region of the free end of the first connecting element 86. Offset in the longitudinal direction 36 toward the end 100 on the wiper arm side, a bridge 96 is integrally formed on the cover wall 92 toward the wiper blade side. On the free end thereof, said bridge has an end 98 angled toward the wiper blade side. During assembly, the wiper blade 10 with the adapter 22 is rotated clockwise about an angle of approximately 90E relative to the first connecting element 86 so that the bearing pin 94 can be inserted through one of the bearing openings 80 into the hub 34 of the base element 24. After that, the wiper blade 10 is rotated back into the initial position thereof, wherein the bridge 96 overlaps the cover cap 72 and is accommodated in the fillet 78. The angled end 98 of the bridge 96 secures the wiper blade 10 with respect to the first connecting element 86 in the direction of the bearing pin 94.

In order to assemble a second connecting element 102 and a third connecting element 120, the cover cap 72 is removed from the base element 24 of the adapter 22. The second connecting element 102 is fixedly connected on the end 104 thereof on the wiper arm side to the wiper arm thereof, which is not depicted, or is integrally formed with said wiper arm. Said second connecting element has a substantially U-shaped cross-sectional profile 106, which is formed by two lateral walls 108 and a cover wall 110, on the end thereof facing in the opposite direction. A latching hole 112 is located in the cover wall 110, in which latching hole the button 40 of the base element 24 fits and latches in the end position of the wiper blade 10. The lateral walls 108 have inwardly projecting guide ribs 116 and a tab 118 on the edges thereof oriented toward the wiper strip 16. The second connecting element 102 is pushed in the longitudinal direction 36 onto the base element 24 of the adapter 22, wherein the tabs 118 and the guide ribs 116 engage into the guide grooves 52 while the cover wall 110 pushes the button 40 downward in the actuating direction 138. In so doing, the slider 42 slides over the latching steps 46 in the direction of the guide grooves 52. In the course of assembly, the tabs 118 and the guide ribs 116 slide further into the guide grooves 52 until the tabs 118 rest against the stops 58 and the button 40 latches into the latching hole 112 by said button returning to the initial position thereof, in which the slider 42 rests with the lower edge thereof against the latching steps 46. In this position, the front abutting faces 114 of the lateral walls 108 of the second connecting element 102 extend right up to the end face 66 of the end cap 26.

In the case of the third connecting element 120, the end 122 on the wiper arm side runs laterally offset to the U-shaped cross-sectional profile 124 which is open to the wiper strip 16 and is formed by the two lateral walls 126 and a cover wall 128. A latching hole 130 for the button 40 of the base element 24 is situated in the cover wall 128. Guide ribs 134 which project inwards and have projections 136 on the ends thereof pointing toward the end cap 26 are provided on the edges of the side walls 126 that are oriented toward the wiper strip 16. The third connecting element 120 is set on the base element 24 with the part thereof protruding over the guide ribs 134 with the projections 136 in the direction of a vertical axis so that the cover wall 128 rests on the upper edges 64 of the lateral walls 30 of the base element 24 while the button 40 is pushed downward in the actuating direction 138. In so doing, the slider 42 leaves the latching steps 46 and covers the end walls of the guide grooves 52, whereby an improper assembly is prevented. During a further relative movement of the base element 24 in the direction of the third connecting element 120, the projections 136 and the guide ribs 134 slide under the guide surfaces 54 so that the base element 24 with the guide surfaces 54 thereof and the upper edges 64 are held between the guide ribs 134 and the cover wall 128. In the end position, the projections 60 abut on the stops 60 of the base element 24 while the button 40 latches into the latching hole 130 and therefore the base element 24 is fixed in the longitudinal direction 36. The base element 24 is guided transversely to the longitudinal direction 36 and to the vertical axis 70 along the lateral walls 126 of the second connecting element 102 by the protruding lower flanks 140 of the guide grooves 52. In the assembled state, the front abutting faces 132 of the lateral walls 126 extend right up to the opposing end faces 66 of the end cap 26, and therefore a closed design results.

Beside the variety of variations, the adapter 22 according to the invention provides a good lateral guidance of the wiper blade 10 as well as a secure fixation in both the longitudinal direction 36 and the direction of the vertical axis 70.

The invention claimed is:

1. An adapter (22) for the articulated connection of a connecting element (86, 102, 120) at the end of a wiper arm to a connector element (18) of a wiper blade (10), wherein the adapter (22) has a base element (24), characterized in that
   the base element (24) has two lateral walls (30) which, at end faces thereof facing away from the wiper arm, are connected by an end cap (26), and in a region of upper edges (64) thereof are connected to each other by a crosspiece (32) and also by a hub (34),
   a resilient tongue (38) extends from the crosspiece (32) to an end face on a wiper arm side and has at a free end thereof an outwardly protruding button (40),
   guide profiles (50) are provided on longitudinal edges of the lateral walls (30) facing towards the wiper strip (16),
   during assembly the button (40) actuates a blocking element (42) such that an improper assembly is prevented by said blocking element, and
   the button (40) has a slider (42) as the blocking element on a wiper arm side thereof, which protrudes laterally over the button (40) and is guided along front edges (44) of the lateral walls (30) in an elastically pliable manner.

2. An adapter (22) according to claim 1, characterized in that the guide profiles (50) have in each case a guide groove (52) which runs in a longitudinal direction (36) and is open to an outside and to the end face on the wiper arm side and a guide rib (56) running in the longitudinal direction and protruding towards the wiper strip (16), wherein guide surfaces (54), which run parallel to the upper edges (64) of the lateral walls (30), adjoin the guide ribs (56) towards the outside.

3. An adapter (22) according to claim 2, characterized in that stops (58 or 60), which laterally protrude over the lateral walls (30), are provided at the guide grooves (52) and the guide surfaces (54) at ends thereof oriented towards the end cap (26).

4. An adapter (3) according to claim 3, characterized in that flanks (140) of the guide grooves (52) oriented towards the wiper strip (16) laterally protrude over the lateral walls (30) so that the stops (60) associated with the guide surfaces (54) protrude further laterally than the stops (58) associated with the guide grooves (52).

5. An adapter (22) according to claim 1, characterized in that in an initial position of the button (40), the slider (42) rests with an edge thereof facing the wiper strip (16) against latching steps (46) in the front edges (44) of the lateral walls (30).

6. An adapter (22) according to claim 5, characterized in that the slider (42) covers the guide grooves (52) on an end face side when the button (40) is pushed in an actuating direction (138) up to the upper edges (64) of the lateral walls (30).

7. An adapter (22) according to claim 1, characterized in that said adapter comprises in addition to the base element (24) a cover cap (72) which with lateral walls (74) thereof encompasses the lateral walls (30) of the base element (24), wherein the lateral walls (74) of the cover cap (72) are connected to each other by a cover wall (76) and the cover wall (76) has a recess (82) on an end face thereof on a wiper arm side, said recess in an assembled state abutting with a stop edge (84) thereof against a front edge of the button (40).

8. An adapter (22) according to claim 7, characterized in that the cover wall (76) of the cover cap (72) has a fillet (78) and the lateral walls (74) of the cover cap have bearing openings (80).

9. An adapter (22) according to claim 7, characterized in that the cover cap (72) has guide ribs (142) on longitudinal edges oriented towards the wiper strip (16), said guide ribs interacting with the guide profiles (50) of the base element (24).

10. An adapter (22) according to claim 1, characterized in that the slider (42) extends from one of the front edges (44) of the lateral walls (30) to another one of the front edges (44).

11. An adapter (22) according to claim 1, characterized in that the slider (42) extends perpendicularly to a longitudinal axis of the base element (24).

12. An adapter (22) according to claim 1, characterized in that the slider (42) is directly connected to the button (40).

\* \* \* \* \*